United States Patent
Wichtlhuber et al.

(10) Patent No.: US 11,122,076 B2
(45) Date of Patent: Sep. 14, 2021

(54) METHOD FOR DEFENDING AGAINST OR MITIGATING DDOS ATTACKS ON IT INFRASTRUCTURES

(71) Applicant: DE-CIX Management GmbH, Cologne (DE)

(72) Inventors: Matthias Wichtlhuber, Miltenberg (DE); Christoph Dietzel, Frankfurt (DE); Thomas King, Dreieich (DE)

(73) Assignee: DE-CIX Management GmbH, Cologne (DE)

( * ) Notice: Subject to any disclaimer, the term of this patent is extended or adjusted under 35 U.S.C. 154(b) by 130 days.

(21) Appl. No.: 16/698,999

(22) Filed: Nov. 28, 2019

(65) Prior Publication Data
US 2020/0177626 A1    Jun. 4, 2020

(30) Foreign Application Priority Data
Nov. 30, 2018    (DE) .................... 10 2018 130 588.5

(51) Int. Cl.
*H04L 29/06*    (2006.01)

(52) U.S. Cl.
CPC .... *H04L 63/1458* (2013.01); *H04L 29/06877* (2013.01); *H04L 63/0236* (2013.01); *H04L 63/1408* (2013.01); *H04L 63/1441* (2013.01); *H04L 2463/143* (2013.01)

(58) Field of Classification Search
CPC ............. H04L 63/1458; H04L 63/1441; H04L 63/1408; H04L 29/06877; H04L 63/0236; H04L 2463/143
See application file for complete search history.

(56) References Cited

U.S. PATENT DOCUMENTS

| | | | | |
|---|---|---|---|---|
| 2010/0064341 A1* | 3/2010 | Aldera | .................. | H04W 12/37 726/1 |
| 2013/0104186 A1* | 4/2013 | Dietz | .................. | H04W 12/126 726/1 |

FOREIGN PATENT DOCUMENTS

JP    2018125745 A    8/2018

* cited by examiner

*Primary Examiner* — Huan V Doan
(74) *Attorney, Agent, or Firm* — Smartpat PLC (57) ABSTRACT

The disclosure relates to computer-based communication systems, such as the Internet, and in particular systems and methods for defending against DoS attacks (denial of service attacks) on Internet servers.

7 Claims, 5 Drawing Sheets

|  | 0 | N | 2N | 3N | 4N |
|---|---|---|---|---|---|
| 10N | OK | OK | OK | OK | OK |
| 8N | OK | OK | OK | OK | OK |
| 6N | OK | OK | OK | OK | OK |
| 4N | OK | OK | OK | OK | OK |
| 2N | OK | OK | OK | OK | OK |
| 0 | OK | OK | OK | OK | OK |

MAC filter criteria (y-axis) / L3-L4 filter criteria (x-axis)

Fig. 5b:

|  | 0 | N | 2N | 3N | 4N |
|---|---|---|---|---|---|
| 10N | F2 | F2 | F2 | F2 | F1 |
| 8N | OK | OK | OK | OK | F1 |
| 6N | OK | OK | OK | OK | F1 |
| 4N | OK | OK | OK | OK | F1 |
| 2N | OK | OK | OK | OK | F1 |
| 0 | OK | OK | OK | OK | F1 |

MAC filter criteria (y-axis) / L3-L4 filter criteria (x-axis)

METHOD FOR DEFENDING AGAINST OR MITIGATING DDOS ATTACKS ON IT INFRASTRUCTURES

TECHNICAL FIELD

The present disclosure relates to computer-based communication systems, such as the Internet, and in particular systems and methods for defending against DoS attacks (denial of service attacks) on Internet servers.

BACKGROUND

Computer systems for providing services, content or data in a publicly accessible network, such as the Internet, are increasingly exposed to attacks. In doing so, attempts are frequently made to block the use of services or content by overloading the computer system. Users can then no longer access the services or data offered. Such denial of service or service blocking attacks, also known as DoS attacks (denial of service), can, for example, prevent the use of an online shop or a media provider via the network for hours or even days, and thus cause considerable economic damage.

In particular, distributed DoS attacks (DDoS), with which a large number of computers make simultaneous and interconnected requests to a computer system, pose a major threat. For example, malicious software, sometimes in the form of a computer virus, installs itself on individual computers without the actual user noticing. Remotely controlled or at a specified time, the malware triggers simultaneous requests to the attacked computer system on all affected computers, which are then also known as bots or zombies. Each request consumes resources of the computer system, which quickly leads to an overload.

Typical DDoS attacks regularly have the goal of overloading a network access or the resources of a firewall, a web server or a database server of the computer system.

The digital transformation and an increasing number of networked devices from the Internet of Things (IoT) are opening up ever new possibilities for attackers. Attack bandwidths of well over one terabit (1,000 Gbit or 1 trillion bits) per second are now possible. While, before 2015, the largest observed and publicly reported attacks were between 50 and 200 Gbps, the current peaks are an order of magnitude higher, exceeding 1 Tbps in 2016 and 1.7 Tbps in early 2018. A massive increase in the number of DDoS attacks has also been observed. Between 2016 and 2017, one-third of all active 24-hour networks are said to have been affected by DDoS attacks.

Bandwidth-intensive, specialized attacks in the multi-hundred gigabit range, such as those generated by various amplification and reflection attacks, for example via UDP or NTP, are also particularly problematic for the affected system operators. Thereby, protocol design errors are exploited, with which a relatively small request triggers a much larger response. With a spoofed source Internet Protocol (IP) address, the response is more strongly reflected to the target. Wave-like attacks and multi-vector attacks also pose increasing challenges for target systems.

Operators of Internet Exchange Points (IXPs) are familiar with the danger of DDoS attacks. They are at the interface between networks and allow connected networks to exchange network traffic with each other. Typically, IXPs are transparent at the network layer; i.e., they do not offer their own routing. However, to facilitate the exchange of Border Gateway Protocol (BGP) routes between many networks, many IXPs offer so-called "routing servers." These provide a multiplexing of the exchange of routes between the connected networks. In contrast to Internet Service Providers (ISPs), IXPs physically separate the control path (the exchange of routing information between connected networks) from the data path (the actual routing of network traffic). Particularly for high-volume attacks, IXPs lend themselves as filter locations because their position between many networks gives them a high capacity to filter network traffic. Nevertheless, the special architecture with separation of control and data path poses a challenge that must be addressed by an effective filtering mechanism.

Currently available defense techniques and tools for use on IXPs can counteract the effects of the attacks only partially or at great expense.

These include, among other things,
(i) traffic scrubbing services (TSSs),
(ii) router access control list filters (ACLs) and
(iii) BGP blackholing (RTBH).

A "traffic scrubbing service" first redirects all user traffic to the TSS's own infrastructure, filters out unwanted data (at the IP level, using considerable computing power) and then routes the "cleaned" traffic to its intended destination. However, such services generate considerable running costs, lead to performance delays due to data redirection and processing, but guarantee a high degree of filter quality.

Router access control list ("ACL") filters are network filters that filter the incoming and outgoing traffic of a network. The filter mechanisms must be specified by the user and typically configured manually by the IXP operator. Implementation and performance depend on the manufacturer-specific hardware that contains the filters. The effectiveness also depends on whether the hardware in question is homogeneous with other hardware, and the point in the network at which the corresponding filter hardware is switched on (the later, the less effective). ACL filter systems are not easily scalable and require a high degree of individual network customization—which makes them more suitable for individual use and less suitable for large scale use on IXPs.

Operators take a different approach to rate limiting: Here, the number of requests of one IP per minute can be limited. Traffic that exceeds the set threshold is simply rejected. Here, however, the service also does not remain online continuously. Sometimes malicious traffic reaches the IP, sometimes not. For users, this can be seen on a website that is always briefly available and offline. Thus, making online purchases is made more difficult or even impossible.

BGP (Border Gateway Protocol) blackholing (RTBH), also known as remote triggered blackhole filtering, is another effective DDoS defense technique.

Since the 1980s, this technology has been used to defend against attacks, and blackholing has been common practice among operators of Internet service providers (ISPs) or IXPs for about 15 years. With blackholing, the operator of the attacked autonomous system (AS) carries out a route announcement of the affected IP ranges via BGP, marked as a "blackhole." This rewrites the next-hop to a predefined blackholing IP address (blackhole). The traffic—whether malicious or legitimate—then no longer flows to the targeted IP address, but towards the blackhole, and is discarded there. The attack traffic can thus no longer cause any damage (for example, link overloads) in the operator's AS, but the service targeted by the attacker is no longer available for legitimate requests. Thus, blackholing protects the operator of the infrastructure to the affected Web server, but it does not protect the accessibility of the affected Web server.

Blackholing is widespread and—at least on the operator's side—at first approximation involves relatively little effort: Using only one switch, traffic is immediately zero-routed. However, the amount of traffic currently discarded cannot be tracked. Thus, it is not possible to tell whether the attack is still ongoing. To check this, the blackholing must be switched on and off again and again. For those responsible, this means a high monitoring effort and possibly system failures if the attack is still active. For customers or the services behind the attacked IP address, blackholing signifies at least a partial failure, unwanted downtime and possibly considerable losses. The central problem is that the entire IP address is zero-routed for at least part or all of the Internet. If, for example, an attack takes place on only one specific parameter, such as port 80, the traffic on all other ports is also dropped. Blackholing does not take into account either the parameters of the attacked IP or the "type" of traffic. It is therefore also referred to as "coarse granular". No matter whether it is malicious or legitimate—everything is discarded.

Particularly in the IXP environment, blackholing is highly problematic, because it requires the cooperation of the sending network—the operator must accept and correctly handle routes marked as "blackhole." In the IXP environment, this is a significant problem, as several hundred networks may have to be brought to an adjustment of their configurations, since the routers that pass through DDoS traffic do not belong to the IXP operator. A network connected to the IXP that does not adjust its configuration for blackholing can render the blackholing mechanism useless for all other networks connected to the IXP.

A comparable approach to blackholing is BGP FlowSpec. This mechanism extends blackholing to a finer granularity by introducing the specification of layer 3 and 4 criteria via BGP for discarding network traffic. However, in the context of IXPs, FlowSpec does not address the problem of the need for potentially hundreds of networks to cooperate to make the mechanism effective.

In summary, all of the above techniques can help to defend against or mitigate DDoS. However, each of the above solutions has its own significant deficiencies. The main deficiencies of TSSs include both cost and resource hunger. The deficits of ACL filters include limited scalability and the need for customer-specific adjustments. RTBH suffers from its coarse granularity and the fact that collaboration between connected networks is required to make the service effective. The latter also affects BGP FlowSpec. In addition, with the exception of TSS and BGP FlowSpec, none of the DDoS defense methods described provides any feedback (telemetry) to the attacked network as to whether the attack is still ongoing or has already ended.

Therefore, the task of the present disclosure is to provide a method for combating DDoS attacks that avoids the disadvantages of the prior art.

SUMMARY

The task is achieved by providing a computer-implemented method for the defense against or mitigation of DDoS attacks on IT infrastructures, which comprises the following steps:
a) Reception of user-generated filter rules sent by users affected by a DDoS attack via BGP signals to a route server of the node operator or to a programming interface provided by the node operator,
b) Calculation of a desired overall system state from the aggregate of the transmitted filter rules in a controller system, derivation of a stream of abstract (that is, hardware-independent) configuration changes,
c) Forwarding of the filter rules to a management system in which the status of all abstract configuration changes generated in step b) is managed, wherein the management system, using the syntax specified by the respective manufacturer and taking into account the manufacturer-specific features, translates into the node hardware-specific configurations exactly those filter rules that correspond to the capabilities of the respective hardware,
d) Activation of the options available in the respective router hardware for setting up network traffic filters, by means of which the filtering and blocking mechanisms on the hardware components are set in motion,
e) Filtering of the data traffic according to the filtering rules forwarded in step c).
f) Blocking or bandwidth limitation of the data traffic filtered out in step e).

There are basically two options for filtering data traffic. Either the filtering takes place at all input ports of the Internet node or only at the individual output port leading to the affected target network (from which the implemented filter rules originate). In accordance with the invention, filtering only at the individual outbound port is preferred, as it is easier to implement because only one port has to be configured according to the customer's specifications.

The disclosed method advantageously includes all hardware components of the node and sets user-generated filter rules for them, which—within the scope of the capacities available in any event—cause a filtering of the data traffic. Thereby, the method uses the standard programming interfaces provided in the firmware of the hardware components, in order to set up and configure the filter rules; it does not replace the existing firmware.

By incorporating the existing node hardware and combining signaling and corresponding filtering, the disclosed method leads to more effective DDoS mitigation. Thus, a significant aspect of the present disclosure is the combination of communicated rules/specifications with the existing node infrastructure and the implementation of the communicated rules in the hardware elements for filtering/blocking/inhibiting harmful data traffic, without the necessity of configuration changes of connected networks; that is, without the cooperation of third parties.

The disclosed method thus combines the advantages of a filter system (already in the node hardware and thus without specialization or configuration requirements for the users/participants) and blackholing. The method relies on a combination of communication for the user-generated specification of filter rules and a filter system that is located in the hardware elements of the node infrastructure and already implements the (user-generated) filter rules here. The involved hardware components (switches) of the node are already technically capable of filtering the passing data traffic according to predefined rules and blocking filtered, critical data traffic or reducing the bandwidth to this extent (so-called "shaping"). Other, non-critical data traffic is still passed through.

As a result, the well-known blackholing technique is replaced by a technique with user-generated rules for fine-granular filtering in the node-operator hardware, without the involvement of third-party hardware. It must be noted that although the method is capable of fully representing the capabilities of the blackholing technique, it differs significantly from the prior art both in the extended filtering capabilities and in the underlying filtering technique and the components involved in it, as explained above.

The disclosed method runs on one or preferably several, for example, servers of the node and integrates all hardware components of the node. Preferably, the disclosed method is implemented in a software program. The software architecture is divided into three levels—signaling, management and filtering. This software is thus a possible implementation or embodiment of the present method in order to use the existing functionality of the hardware of the node operator for protection against DDoS attacks and, in doing so, to automatically adjust the necessary filter rules to the network hardware in use (each manufacturer implements a slightly different system for setting up and configuring filters on its system). Furthermore, the software preferably takes into account the performance of the respective network hardware and the rights of the customers who wish to use the invention. For example, the number of possible rules depends on the network hardware used, so that performance does not suffer, and the possibility of one user setting a filter rule for the systems of another user must also be prevented.

The management level of the software implementing the disclosed method preferably consists of two components—a controller and a network manager. The controller is responsible for tracking filter rules and their changes, as signaled by the route server or the programming interface on behalf of the members. The network manager implements the changes to the filter rules by calculating the hardware-specific configuration changes. The controller implements a programming interface for direct addressing by the customer and/or a BGP parser and a BGP processor for addressing by customers via BGP. The BGP parser manages the "internal BGP" (iBGP) session with the route server and analyzes the incoming message stream. The BGP processor processes the semantics of BGP messages and stores the announced routes in a routing information base (RIB). Filter rules requested via a possibly existing programming interface are also stored in the RIB. The controller then calculates the differences between state changes of the RIB. Essentially, these differences represent a series of abstract (that is, still hardware-independent) configuration changes that must be applied to the network in order to implement all requested filter rules. Such configuration changes are then forwarded to the network manager via a software queue. The network manager compiles the abstract configuration changes into hardware-specific ones and applies them to the hardware.

It must be noted that an abstract high-level configuration change may require several concrete low-level configuration changes on multiple switches. To limit the number of configuration changes within a time interval to a rate that can be handled by the switch hardware, the queue uses a token bucket algorithm. It ensures that the configurable maximum burst size (MBS) and a reasonable long-term rate limit is never exceeded. The requested configuration changes are queued by the network manager. At the abstract level, the network manager compiles abstract configuration changes, as provided by the controller, into hardware-specific ones. The changes are then made available on the forwarding hardware (data level) of the IXP, taking into account the hardware limitations of the actual IXP infrastructure. As already mentioned, there are several different possible implementations for the network manager. In fact, the feasible set depends on the capabilities of the existing IXP hardware.

Two solutions for the network managers were implemented as examples, one with manufacturer-specific QoS guidelines and one SDN-based solution. Each network manager has access to a description of the hardware restrictions via a hardware information base. This includes, for example, the number of allowed QoS guidelines per port or the number of OpenFlow rules that can be installed on a switch. Based on this information, the configuration compiler can ensure that the restrictions are met.

The filter level of the software implementing the disclosed method depends essentially on the actually used IXP hardware. If the IXP platform is not SDN-based, the available implementation option is preferred, namely QoS guidelines or ACL filters. QoS guidelines/ACL filters can be applied either to all inbound ports of IXP members or to the target IXP outbound port. In the first case, incoming traffic to the IXP platform is interrupted or reduced. In the latter case, outbound traffic from the IXP platform is interrupted or reduced.

The latter variant is preferred, primarily to minimize the complexity of the configuration method. Configuration changes are minimized because only the target port and not the configuration of all other (n−1) ports needs to be updated. In addition, an update from an IXP member only results in changes to the port configuration of exactly this IXP member. Thus, the causality is maintained. This implementation option is currently available with the notifying party, as it has (at least at the time of the submission of the present notification) sufficient capacity to transfer network attack traffic through the IXP platform to the bottleneck ports of the IXP members. The reduction of traffic as it leaves the platform also has the advantage that telemetry information can be made available to the member IXP.

Nevertheless, switching from output filters to input filters may be a preferred variant for use with smaller IXPs, where platform bandwidth is a bottleneck.

The invention is discussed in the following on the basis of an example that serves to clarify the technical teaching and its possible applications, but is not intended to limit the invention to these.

DETAILED DESCRIPTION

In order to ensure that the disclosed method can be used on the IXP, it is important that it adheres to the limits of the hardware of the IXP. As such, a laboratory setup was used to test how the method scales with an increasing number of filters and ports, and whether the limits for updating the configuration are sufficient to support the method.

The test setup consisted of an IXP edge router (ER), a hardware-accelerated packet generator, a resource monitor and software implementing the disclosed method. The ER is configured with a production configuration of more than 350 member ports, which is the highest port density currently in use at the notifying party's site. A set of filter rules per port has been generated. Each rule uses either a MAC filter to block traffic from a particular network (as required to filter traffic from a particular source network) or a random subset of L3-L4 criteria in order to block traffic (the filtering features in accordance with the invention). The percentage of networks (ports) used by the invention was then increased, along with the number of filter rules per port.

Figure 1:
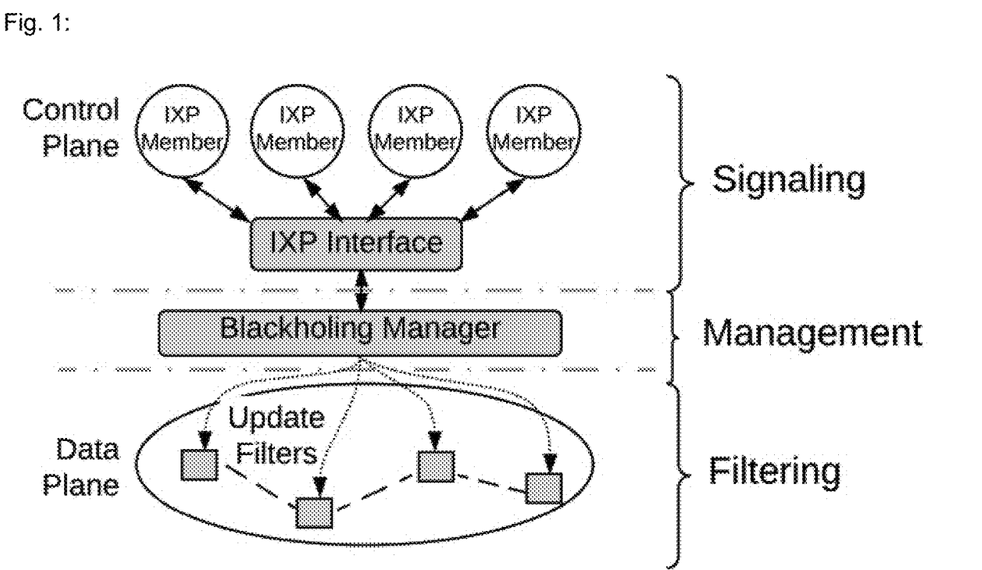
FIG. 1: Software architecture for the implementation of the disclosed method.
Figure 2:
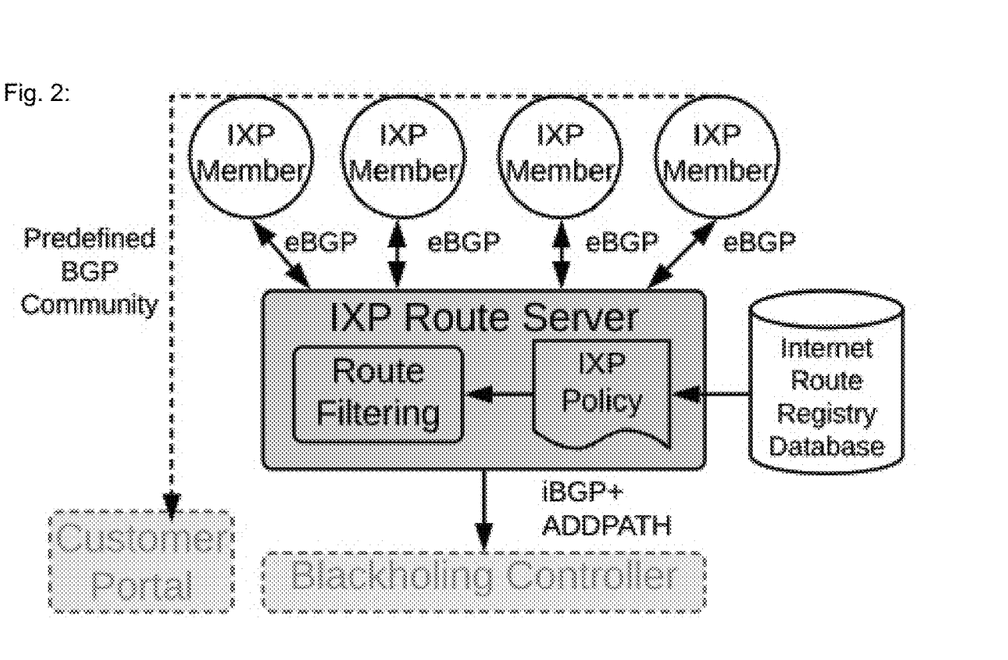
FIG. 2: Implementation of the signal level.
Figure 3:
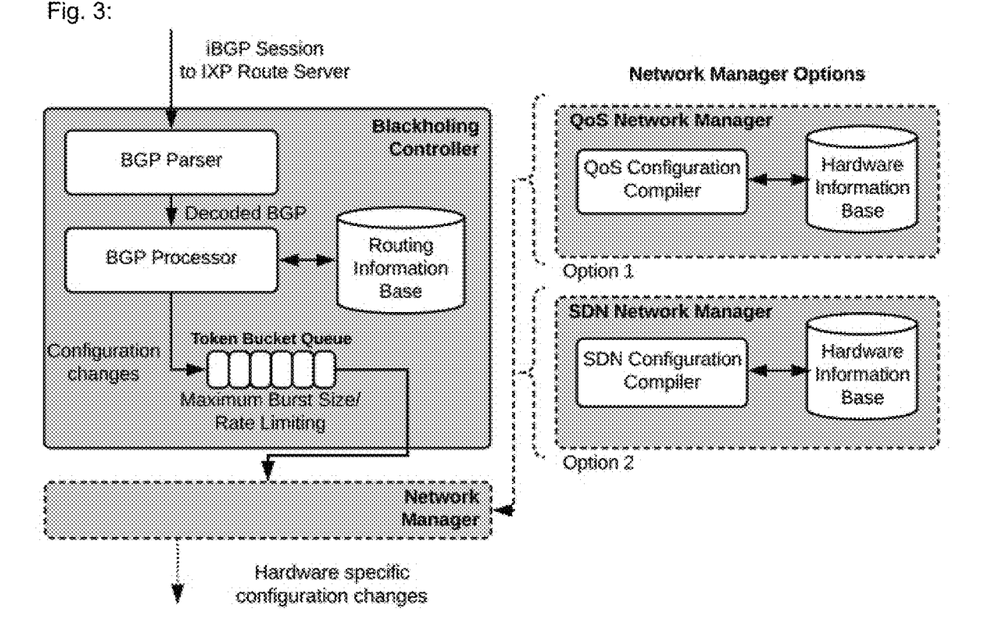
FIG. 3: Implementation of the management level.
Figure 4:
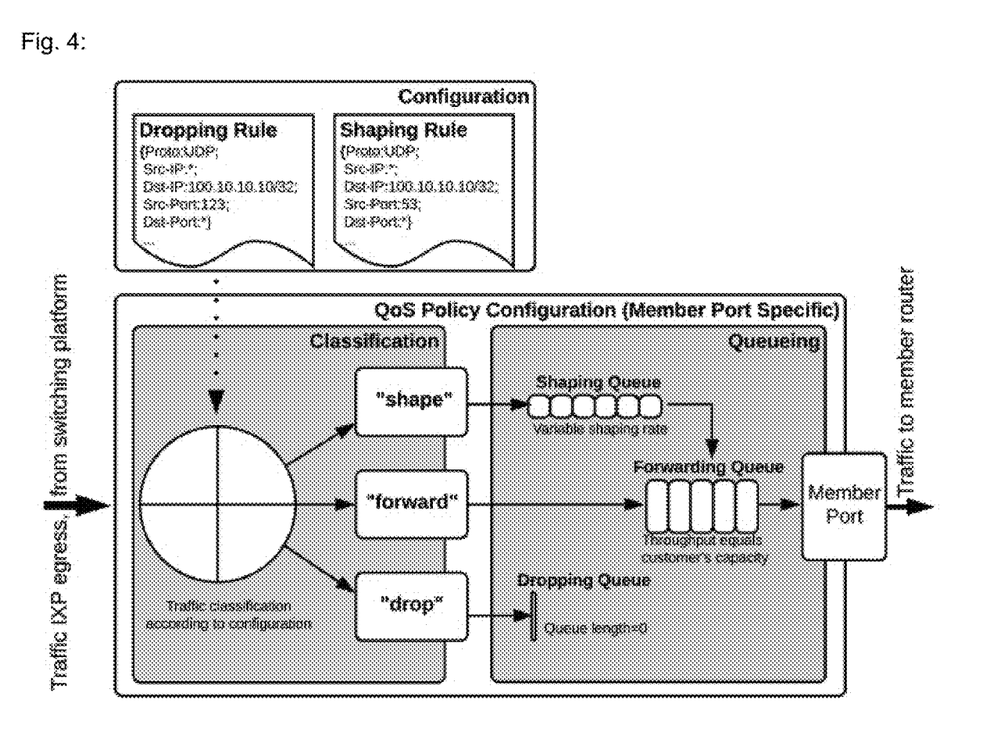
FIG. 4: Implementation of the filter level using QoS guidelines.
Figure 5A:
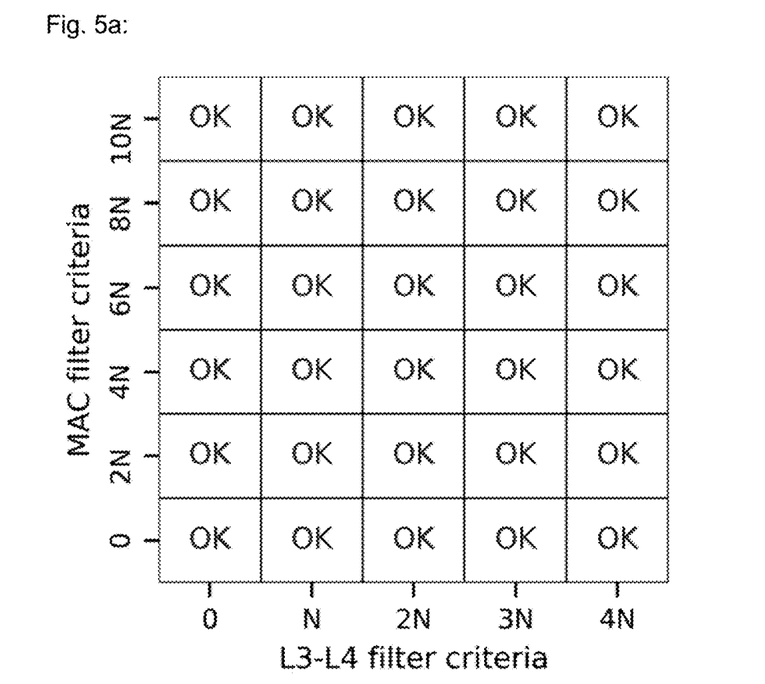
FIG. 5a): 20% IXP member acceptance rate.
Figure 5B:
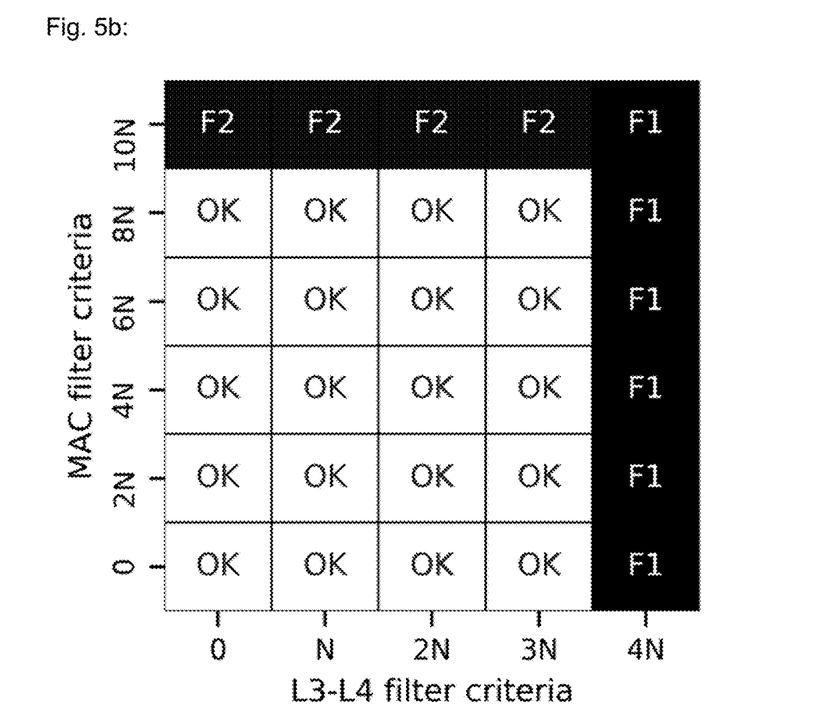
FIG. 5b): 60% IXP member acceptance rate.
Figure 5C:
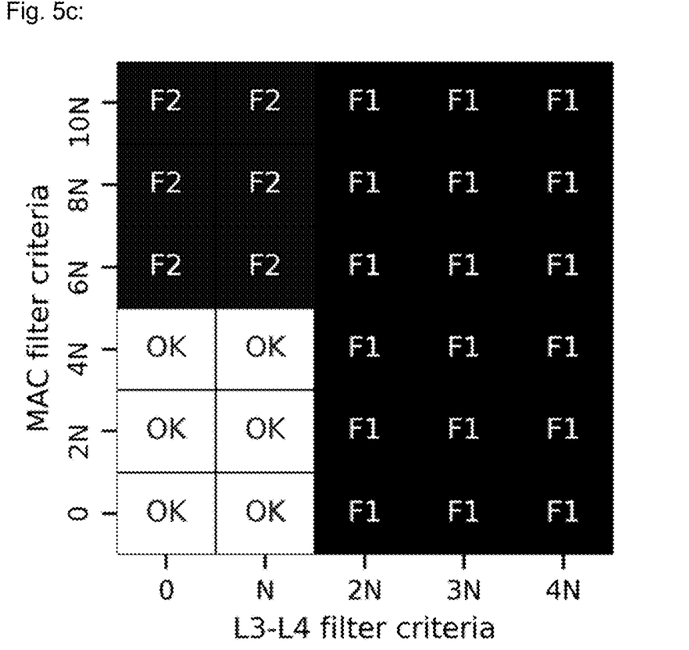
FIG. 5c): 100% IXP member acceptance rate.

FIGS. 5 a)-5 c) shows the resulting limits for three different fractions of IXP member AS that actively used the software.

It commenced with 20%, thus twice the percentage of IXP members currently using RTBH daily, followed by 60%, a high acceptance rate, to a 100% IXP member acceptance rate.

For each acceptance rate, there was an examination as to whether sufficient hardware resources were available to increase the number of filters along both dimensions, namely MAC filters (shown on the y-axis) and L3-L4 filters (shown on the x-axis).

OK corresponds to sufficient resources; F1 and F2 correspond to insufficient resources; that is, the total number of filter criteria for QoS guidelines (L3-L4) is exceeded or the maximum number of MAC filters per port (L2) is exceeded.

It is not surprising that the realizable range, that is, the range marked with OK, decreases, because the IXP members used more filter rules or more IXP members used the software.

The starting point, FIG. 5(a), shows the following: While the number of software users is twice the number of current (June 2018) RTBH users, they each used more rules to take advantage of the disclosed method. Scalability limits could not be detected.

Next, see FIG. 5(b); it was assumed that the acceptance rate would increase to 60% of IXP members. There was clearly still a large margin for the number of MAC filters (8N) and the number of L2-L4 filters (3N). Even with an acceptance rate of 100%, see FIG. 5(c), the safety margin is still significant.

It must be noted that the experiments assumed that each individual IXP member simultaneously increases its number of parallel filter rules (strain test). As such, it can be concluded that the software implementing the disclosed method can be used without exceeding the filter resources of the IXP platforms.

There was also an examination as to whether the hardware can maintain the update frequency prescribed by the disclosed method. An overview of the software and IXP's ER hardware shows that the limiting factor is the CPU resources of the ER. In particular, a real-time operating system is running at the control level of the ER and the current configuration imposes a hard CPU limit of 15% for configuration tasks. To verify that this is sufficient, the CPU resources of the ER were measured while increasing the number of add and remove operations for blackholing rules.

Figure 6A:
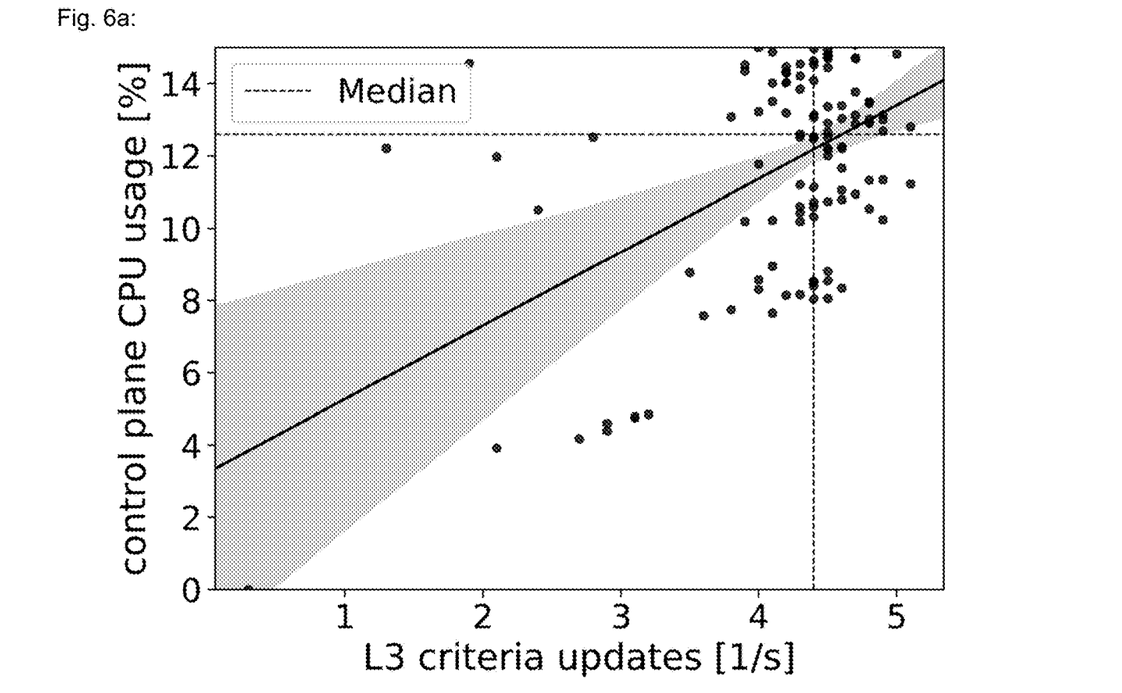
FIG. 6a): Number of rule changes processed in a five-second interval (scaled to 1 second) compared to the corresponding CPU usage.

FIG. 6(a) shows how many rule changes were processed in a five-second interval (scaled to 1 second) compared to the corresponding CPU usage. With a CPU utilization of 15%, the ER can process a median of 4.33 rule changes per second. In order to predict how long it takes for a filter rule to take effect, a controlled experiment was performed with the controller's token bucket queue—configuration changes generated from the traces of the RTBH service of the notifying party were recorded. These configuration changes are queued at a rate of 4/5 per second (to mimic the rule's average update rate of 4.33).

Figure 6B:
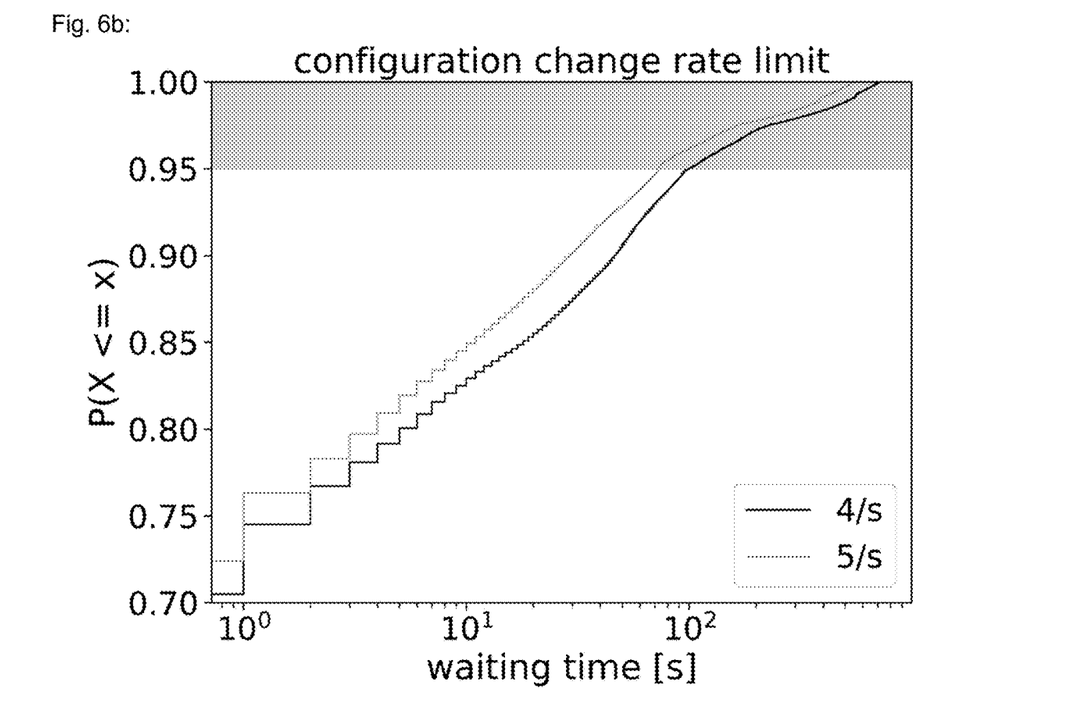
FIG. 6b): Dwell time of each update in the queue
FIG. 6c): Successful containment of a DDos attack using the disclosed method.
Figure 6C:
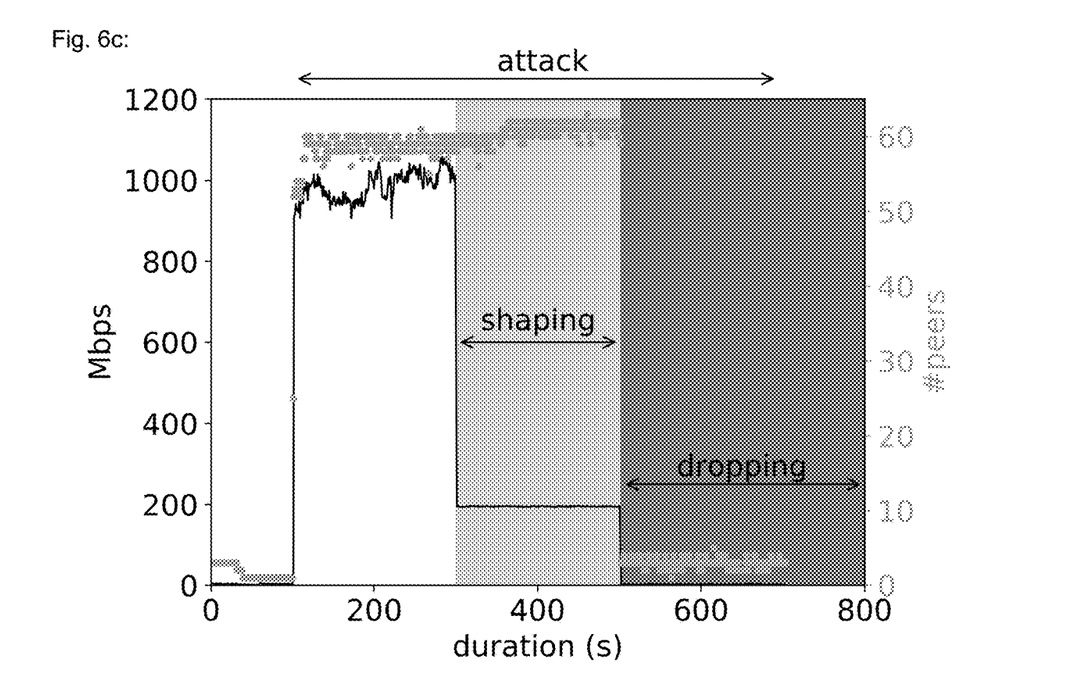

FIG. 6(b) shows how long each update remained in the queue; that is, the time from the blackholing signal to configuration. 70% of all configuration changes are well below 1 second. In view of the setup overhead of alternative solutions, for example TSS and manually configured ACLs, such results certainly seem acceptable from the point of view of IXP members.

Thus, the disclosed method can be used at the IXP and does not overstrain current hardware.

In addition to the disclosed method
   a system for executing a computer-implemented method for defending against or mitigating DDoS attacks on IT infrastructures, in or by means of which the steps of the disclosed method are executed, and
   a computer program product containing computer-readable program instructions on a non-volatile (non-transitory) computer-readable medium for executing a computer-implemented method for defending against or mitigating DDoS attacks on IT infrastructures, which cause a computer to execute the steps of the disclosed method,
represent further subjects of the present disclosure.

The computer program product in accordance with the disclosure may include a computer-readable storage medium (or media) with computer-readable program instructions contained therein, in order to cause a processor to perform aspects of the present disclosure. The computer-readable storage medium may be a physical unit capable of retaining and storing instructions for use by an instruction-executing unit. For example, the computer-readable storage medium may be, but is not limited to, an electronic storage unit, a magnetic storage unit, an optical storage unit, an electromagnetic storage unit, a semiconductor storage unit, or any suitable combination of the foregoing. A non-exhaustive list of more specific examples of computer-readable storage media includes: a portable computer diskette, a hard disk, a random access memory (RAM), a read-only memory (ROM), an erasable programmable read-only memory (EPROM or flash memory), a static random access memory (SRAM), a portable CD-ROM, a DVD, a memory stick, a floppy disk, a mechanically encoded device such as punch cards or raised structures in a groove with commands recorded thereon, and any suitable combination of the aforementioned elements.

With a computer-readable storage medium, such as the one used here, it cannot be assumed that there are inherently volatile signals such as radio waves or other freely propagating electromagnetic waves, electromagnetic waves propagating through a waveguide or other transmission media (for example, light pulses passing through an optical fiber cable), or electrical signals transmitted over a wire.

Computer-readable program commands described here can be downloaded from a computer-readable storage medium to corresponding data processing units or to an external computer or storage unit via a network such as the Internet, a LAN, a WAN and/or a wireless network. The network may include copper transmission cables, fiber optics, wireless transmission, routers, firewalls, switches, gateway computers and/or edge servers. A network adapter card or network interface in each data processing unit receives computer-readable program instructions from the network and routes the computer-readable program instructions for storage on a computer-readable storage medium within the data processing unit concerned.

Computer-readable program instructions for performing operations of this disclosure may be assembly language instructions, instruction set architecture (ISA) instructions, machine instructions, machine-dependent instructions, microcode, firmware instructions, data fixed to a state, or either source code or object code written in any combination of one or more programming languages, such as Python, an object-oriented programming language such as Smalltalk, C++ or the like, as well as in conventional procedural programming languages such as "C" or similar programming languages.

However, the embodiments of the invention are not described with reference to a specific programming language. It is understood that a variety of programming languages can be used to implement different embodiments of the invention described herein, and references to a specific language are merely exemplary embodiments of the invention.

Finally, it must be noted that the language used in the description was chosen mainly for reasons of readability and better understanding, and not to limit the subject matter of the invention to that. Accordingly, the disclosure of the embodiments of the invention are to be an illustrative example and not limit the scope of the invention set forth in the following claims.

The computer-readable program instructions can be executed entirely on the user's computer, partly on the user's computer, as a stand-alone software package, partly on the user's computer and partly on a remote computer, or entirely on the remote computer or server. In the latter scenario, the remotely arranged computer may be connected to the user's computer via any type of network, including a LAN or WAN, or the connection may be made to an external computer (for example, via the Internet using an Internet service provider). With some embodiments, an electronic circuit such as a programmable logic circuit, field-programmable gate arrays (FPGAs) or programmable logic arrays (PLAs) can execute the computer-readable program instructions by using state data of the computer-readable program instructions to personalize the electronic circuit and to perform aspects of the present invention.

Embodiments of the present invention are described here with reference to illustrations of flow charts and/or block diagrams of processes, devices (systems) and computer program products. It should be clear that each block of the flow chart illustrations and/or block diagrams as well as combinations of blocks in the flow chart illustrations and/or block diagrams can/could be realized by computer-readable program instructions. These computer-readable program instructions may be provided to a processor of a general purpose computer, special purpose computer or other programmable data processing device in order to create a machine, such that the instructions executed through the processor of the computer or other programmable data processing device create a means by which the functions/actions specified in the block or blocks of the flowchart and/or block diagram may be implemented. Such computer-readable program instructions may also be stored on a computer-readable storage medium capable of instructing a computer, a programmable data processing device and/or other units to function in a specific manner, such that the computer-readable storage medium with instructions stored thereon includes an article of manufacture containing instructions that implement aspects of the function/action specified in the block or blocks of the flowchart and/or block diagram. The computer-readable program instructions may also be loaded into a computer, other programmable data processing device or other unit, in order to cause a series of functional steps to be executed on the computer, other programmable data processing device or other unit, such that the instructions executed on the computer, other data processing device or other unit realize the functions/actions specified in the block or blocks of the flowchart and/or block diagram. The flowcharts and the block diagrams in the figures provide the architecture, functionality and operation of possible realizations of systems, procedures and computer program products according to different embodiments of the present invention. Thus, each block of the flowcharts or block diagrams may represent a module, segment or part of instructions, which has one or more executable instructions capable of realizing the one or more specified logical functions. With some alternative embodiments, the functions mentioned in the block may appear in a different order than those mentioned in the figures. For example, two sequentially represented blocks may actually occur substantially simultaneously, or the blocks may sometimes be executed among each other in reverse order, depending on the functionality involved. It must also be noted that each block of the block diagrams and/or flowchart illustrations, as well as combinations of blocks in the block diagrams and/or flowchart illustrations, can be implemented or performed by special hardware-based systems that perform the specified functions or actions or combinations thereof, or by combinations of special hardware and computer instructions.

The terminology used here serves only to describe certain embodiments of the present invention and is not intended as a limitation of the present invention.

In the sense used here, the singular forms "a/an" and "the" should also include the plural forms, unless the context clearly dictates otherwise. It should also be equally obvious that the verbs "has" and/or "features" in this application for protection indicate the presence of the specified characteristics, integers, steps, operations, elements and/or components, without, however, excluding the presence or addition of one or more other characteristics, integers, steps, operations, element components and/or groups thereof.

The relevant structures, materials, actions and equivalents of all means or steps in addition to the functional elements in the claims below include all structures, materials or actions by which the function may be performed in conjunction with other claimed elements as expressly claimed herein. The description of embodiments of the present invention has been provided for illustrative and explanatory purposes, and is not to be understood as complete or restrictive with respect to the disclosure described in such form. The person skilled in the art knows that numerous changes and modifications are possible without deviating from the scope of the invention. The embodiments of the present invention have been selected and described to best explain the basic principles of the invention and its practical application, and to enable other skilled persons to understand the invention and various embodiments thereof with various modifications as appropriate for the particular use under consideration.

An additional subject of the present disclosure is a computer data signal (data carrier signal) incorporated in a carrier wave, wherein the computer data signal comprises any embodiment of a computer program product or other combinations of data described herein. The computer data signal is a product presented in a physical carrier and modulated or otherwise encoded in a carrier wave transmitted in accordance with an appropriate transmission method.

The invention claimed is:

1. A computer-implemented method for defending against or mitigating distributed denial of service (DDoS) attacks on information technology (IT) infrastructures, comprising the following steps:

a) receiving user-generated filter rules sent by users affected by a DDoS attack via Border Gateway Protocol (BGP) signals to a route server of an Internet node or to a programming interface provided by the Internet node;

b) calculating, in a controller system, a desired overall system state from an aggregate of the user-generated filter rules and deriving a stream of hardware-independent configuration changes;

c) forwarding the user-generated filter rules to a management system in which a status of the stream of hardware-independent configuration changes generated in step b) is managed, wherein the management system, using a syntax specified by a respective manufacturer and taking into account manufacturer-specific features, translates exactly the user-generated filter rules into hardware-specific configurations that correspond to capabilities of a respective hardware;

d) activating options available in the respective hardware for setting up network traffic filters, by means of which filtering and blocking mechanisms on the respective hardware are activated;

e) filtering data traffic according to the filtering user-generated rules forwarded in step c); and f) blocking or bandwidth limiting the data traffic filtered in step e).

2. The method according to claim 1, wherein the filtering the data traffic takes place at an output port assigned to one of the users.

3. The method according to claim 1, wherein the method uses a standard programming interfaces provided in a firmware of the respective hardware to set up and configure the user-generated filter rules.

4. The method according to claim 1, wherein the method is implemented in form of software running on a plurality of servers of the Internet node.

5. The method according to claim 4, wherein an architecture of the software is divided into a signaling level, a management level and a filtering level.

6. The method according to claim 5, wherein the management level consists of two components, namely a controller, which is responsible for tracking the user-generated filter rules and their changes as signaled by the route server or via a programming interface on behalf of the users, and a network manager, which implements the changes of the filter rules by calculating the hardware-specific configuration changes.

7. A system for executing a computer-implemented method for defending against or mitigating distributed denial of service (DDoS) attacks on information technology (IT) infrastructures, the system comprising:

a route server computer of an Internet node or to a programming interface provided by the Internet node configured to receive user-generated filter rules sent by users affected by a DDoS attack via Border Gateway Protocol (BGP) signals;

a controller configured to calculate a desired overall system state from an aggregate of the user-generated filter rules and to derive a stream of hardware-independent configuration changes;

a network manager to which the user-generated filter rules are forwarded and in which a status of the stream of hardware-independent configuration changes generated by the controller is managed, wherein the network manager, using a syntax specified by a respective manufacturer and taking into account manufacturer-specific features, translates exactly the user-generated filter rules into hardware-specific configurations that correspond to capabilities of a respective hardware;

wherein the respective hardware makes available activating options for setting up network traffic filters, by means of which filtering and blocking mechanisms on the respective hardware are activated;

wherein data traffic is filtered according to the filtering user-generated rules forwarded to the network manager; and wherein the filtered data traffic is blocked or bandwidth limited.

* * * * *